US012715402B2

(12) United States Patent
Shibata

(10) Patent No.: US 12,715,402 B2
(45) Date of Patent: Aug. 25, 2026

(54) BRAKE DEVICE FOR VEHICLE

(71) Applicant: DENSO CORPORATION, Kariya-city (JP)

(72) Inventor: Yusuke Shibata, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 16 days.

(21) Appl. No.: 19/041,617

(22) Filed: Jan. 30, 2025

(65) Prior Publication Data

US 2025/0178577 A1 Jun. 5, 2025

Related U.S. Application Data

(63) Continuation of application No. PCT/JP2023/026039, filed on Jul. 14, 2023.

(30) Foreign Application Priority Data

Aug. 1, 2022 (JP) ................................ 2022-122869

(51) Int. Cl.
*B60T 8/172* (2006.01)
*B60T 8/171* (2006.01)
*B60T 13/74* (2006.01)

(52) U.S. Cl.
CPC .............. *B60T 8/172* (2013.01); *B60T 8/171* (2013.01); *B60T 13/741* (2013.01)

(58) Field of Classification Search
CPC .......... B60T 13/74; B60T 8/171; B60T 8/172; B60T 13/741
See application file for complete search history.

(56) References Cited

U.S. PATENT DOCUMENTS

2008/0059023 A1 3/2008 Ueno et al.
2016/0091039 A1 3/2016 Masuda
2017/0108067 A1* 4/2017 Masuda ................ F16D 55/226
2017/0321773 A1* 11/2017 Lee ....................... F16D 55/226
2018/0244157 A1* 8/2018 Hirakawa ................. B60L 7/18
2020/0108807 A1* 4/2020 Ohkubo ................ F16D 65/183
2022/0355771 A1* 11/2022 Fujita ...................... B60T 17/22
(Continued)

FOREIGN PATENT DOCUMENTS

JP 2000-213575 A 8/2000
JP 2024-034766 A 3/2024
(Continued)

*Primary Examiner* — Long T Tran
(74) *Attorney, Agent, or Firm* — Precision Patents, P.C.

(57) ABSTRACT

A torque command calculation unit changes a torque command value in an order of first to fourth processes when increasing an actual braking force and maintaining it at a required braking force. In the first process, an excess operation is performed. In the second process, an excess operation is performed to increase the torque of the motor until the actual braking force reaches a target excess braking force. In the third process, a holding operation is performed in which the torque of the motor is reduced while the braking force at an end of the excess operation is maintained. In the fourth process, a return operation is performed to reduce the torque of the motor along an inverse efficiency line until the actual braking force reaches the required braking force. The torque command calculation unit executes a position control by a position controller at least in the second process.

12 Claims, 12 Drawing Sheets

(56) References Cited

U.S. PATENT DOCUMENTS

| | | | | |
|---|---|---|---|---|
| 2023/0044940 | A1* | 2/2023 | Kim | B60T 17/22 |
| 2023/0070909 | A1* | 3/2023 | Takimoto | F16D 65/183 |
| 2024/0262331 | A1* | 8/2024 | Takimoto | B60T 8/17 |
| 2024/0326761 | A1* | 10/2024 | Putz | B60T 8/17 |
| 2025/0211150 | A1 | 6/2025 | Shibata | |
| 2025/0219561 | A1 | 7/2025 | Shibata et al. | |
| 2025/0222907 | A1 | 7/2025 | Shibata | |

FOREIGN PATENT DOCUMENTS

| | | | |
|---|---|---|---|
| WO | 2024/048290 | A | 3/2024 |
| WO | 2024/048291 | A | 3/2024 |

* cited by examiner

400
BRAKING FORCE CONTROL UNIT
40
50
55
REQUIRED BRAKING FORCE
TORQUE COMMAND CALCULATION
TORQUE COMMAND
CURRENT COMMAND CALCULATION
CURRENT COMMAND
INVERTER
15
72
θ
ANGLE (POSITION) SENSOR
MOTOR
60
73
X
STROKE (POSITION) SENSOR
LINEAR MOTION MECHANISM
85
71
F
LOAD SENSOR
DISC
PAD
CALIPER
87
86
ELECTRIC BRAKE
88
IIIa
81, 82, 83, 84

THIRD EMBODIMENT

BRAKE DEVICE FOR VEHICLE

CROSS REFERENCE TO RELATED APPLICATIONS

This application is a continuation application of International Patent Application No. PCT/JP2023/026039 filed on Jul. 14, 2023, which designated the U.S. and based on and claims the benefits of priority of Japanese Patent Application No. 2022-122869 filed on Aug. 1, 2022. The entire disclosure of all of the above applications is incorporated herein by reference.

TECHNICAL FIELD

The present disclosure relates to a brake device for a vehicle.

BACKGROUND

Conventionally, in an electric brake device for a vehicle in which a relationship between a motor torque and a pressing force applied to a brake disc from a motion conversion mechanism has a hysteresis characteristic, a technique is known for controlling a drive of the motor so that a magnitude of the pressing force reaches a target value.

SUMMARY

An object of the present disclosure is to provide a brake device for a vehicle which, when a braking force is increased and maintained, reduces a deviation from a required braking force.

The brake device for vehicle in the present disclosure is mounted on a vehicle in which multiple electric brakes are provided on each wheel, and converts a torque output by a motor into a linear force by a linear mechanism and generates a braking force pressed against a corresponding wheel.

The brake device for vehicle includes a braking force control unit that has a torque command calculation unit and a current command calculation unit and controls the braking force generated by each electric brake. The torque command calculation unit calculates a torque command value for the motor based on a required braking force commanded from an external source. The current command calculation unit calculates a current command value for supplying current to the motor based on the torque command value.

The electric brake is equipped with a position sensor that detects an actual rotation angle of the motor, or an actual position, which is an actual stroke of the linear motion mechanism.

A relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a holding critical value, the braking force is maintained constant, and as the torque decreases from the holding critical value, the braking force decreases along an inverse efficiency line.

The torque command calculation unit has a position controller that calculates a torque command value so that an actual position detected by the position sensor approaches the position command value. When increasing the actual braking force, which is the braking force actually output by the electric brake, and maintaining the actual braking force at the required braking force, the torque command calculation unit changes the torque command value in the order of a first process, a second process, a third process, and a fourth process.

The torque command calculation unit executes a position control by the position controller at least in the second process.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
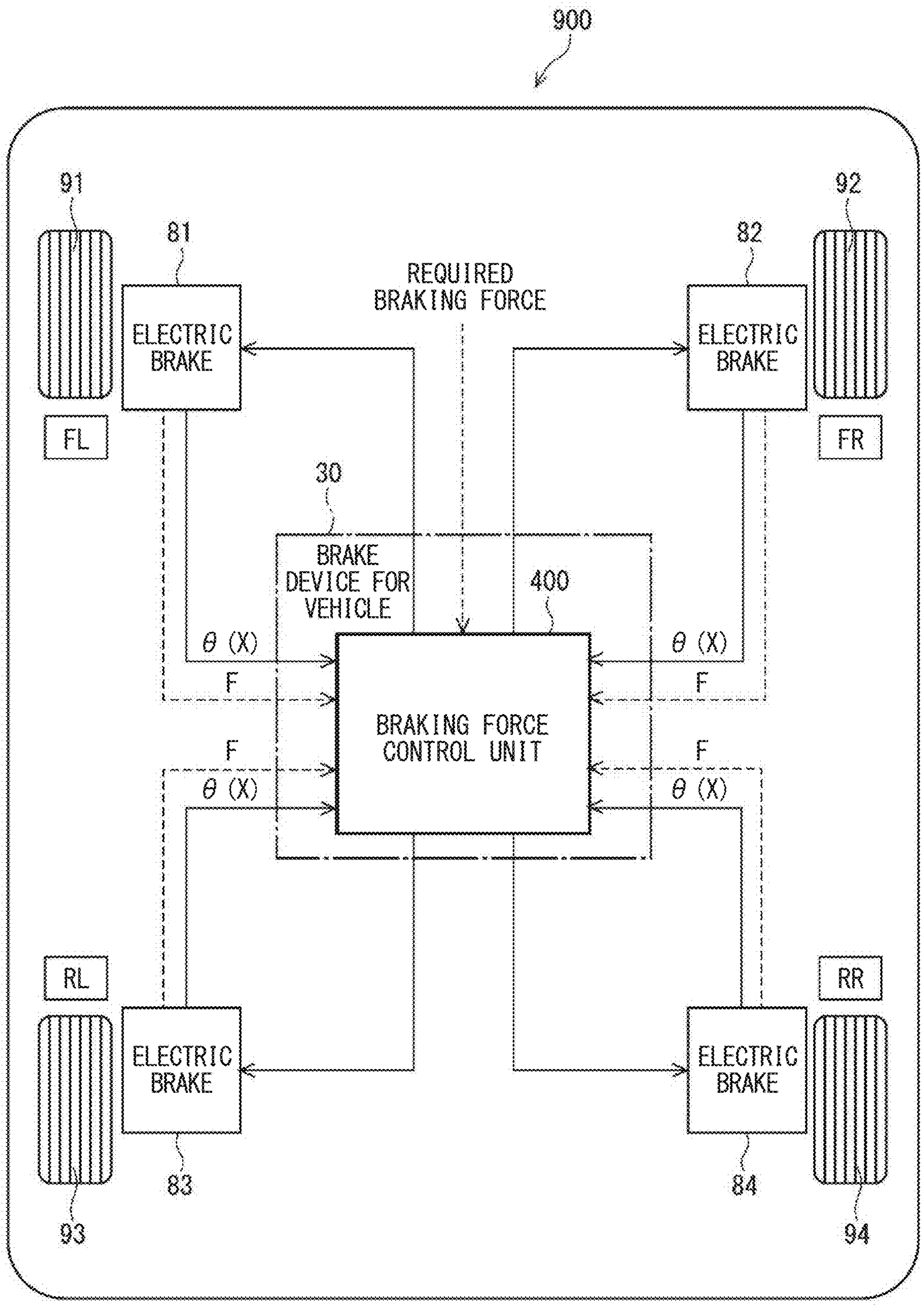
FIG. 1 is a diagram illustrating a configuration of a vehicle with which a braking device for a vehicle according to each of first to third embodiments is equipped.

In an assumable example, in an electric brake device for a vehicle in which a relationship between a motor torque and a pressing force applied to a brake disc from a motion conversion mechanism has a hysteresis characteristic, a technique is known for controlling a drive of the motor so that a magnitude of the pressing force reaches a target value. For example, in the electric brake device, a motor control device controls a drive current of the motor based on the magnitude of the pressing force detected by a load sensor. The relationship between the motor torque and the pressing force has a hysteresis characteristic. This motor control device controls the motor drive current so that when the pressing force is applied on the brake disc and maintained, the motor torque is increased until the magnitude of the pressing force detected by the load sensor reaches a predetermined value greater than a target value, and then the motor torque is decreased until the magnitude of the pressing force detected by the load sensor reaches the target value.

In this specification, the “pressing force” is referred to as a “load”. The braking force correlates with the load, and the required braking force is reflected in a load command value. When the braking force is increased, an operation of increasing the motor torque along a positive efficiency line until the braking force reaches the requested braking force is referred to as an "increasing operation." An operation of increasing the motor torque along the positive efficiency line until the braking force reaches a value that is a predetermined excess amount greater than the required braking force is referred to as an "excess operation." The operation in which the motor torque is reduced while maintaining the braking force at the end of the excess operation is referred to as a "holding operation." After the holding operation is performed, an operation in which the motor torque is reduced along an inverse efficiency line until the braking force reaches the required braking force is referred to as a "return operation."

In order to reduce a deviation between the required braking force reflected in the load command value and the braking force during the holding operation, it is preferable to set an offset value during the excess operation as small as possible. However, since a load sensor generally has low accuracy, the assumable example requires that the braking force be changed during the excess operation to correspond to an offset value equal to or greater than a resolution of the load sensor. As a result, during the holding operation, a deviation between the actual braking force and the required braking force becomes larger, which may lead to a deterioration in brake feeling.

Furthermore, when the pads or discs are deformed due to temperature changes or the like, a phenomenon may occur in which the operating point does not change even though the load is changing. In this case, the effect of reducing the drive current of the motor may not be sufficient.

An object of the present disclosure is to provide a brake device for a vehicle which, when the braking force is increased and maintained, reduces the deviation from the required braking force and ensures the effect of reducing the motor drive current.

The brake device for vehicle in the present disclosure is mounted on a vehicle in which multiple electric brakes are provided on each wheel, and converts the torque output by a motor into a linear force by a linear mechanism and generates the braking force pressed against the corresponding wheel.

The brake device for vehicle includes a braking force control unit that has a torque command calculation unit and a current command calculation unit and controls the braking force generated by each electric brake. The torque command calculation unit calculates a torque command value for the motor based on a required braking force commanded from an external source. The current command calculation unit calculates a current command value for supplying current to the motor based on the torque command value.

The electric brake is equipped with a position sensor that detects an actual rotation angle of the motor, or an actual position, which is an actual stroke of the linear motion mechanism.

A relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a holding critical value, the braking force is maintained constant, and as the torque decreases from the holding critical value, the braking force decreases along an inverse efficiency line.

The torque command calculation unit has a position controller that calculates a torque command value so that an actual position detected by the position sensor approaches the position command value. When increasing the actual braking force, which is the braking force actually output by the electric brake, and maintaining the actual braking force at the required braking force, the torque command calculation unit changes the torque command value in the order of a first process, a second process, a third process, and a fourth process.

In the first process, an "increasing operation" is performed to increase the motor torque along the positive efficiency line until the actual braking force reaches the required braking force. In the second process, an "excess operation" is performed in which the motor torque is increased along the positive efficiency line following the first process until the actual braking force reaches a target excess braking force that is a predetermined excess amount greater than the required braking force. In the third process, a "holding operation" is performed in which the motor torque is reduced while the braking force at an end of the excess operation is maintained. In the fourth process, a "return operation" is performed to reduce the motor torque along the inverse efficiency line until the actual braking force reaches the required braking force.

The torque command calculation unit executes a position control by the position controller at least in the second process.

In the present disclosure, by performing the position control using a highly accurate position sensor during the excess operation of the second process, the deviation between the actual braking force and the required braking force during the holding operation can be reduced, preventing a deterioration in the feeling. Furthermore, even if a load change occurs due to a temperature change or the like, the position of the motor and the linear motion mechanism can be directly detected by the position sensor, so that the motor drive current can be reduced until an operating point changes reliably.

Hereinafter, a brake device for a vehicle according to several embodiments of the present disclosure will be described with reference to the drawings. In the multiple embodiments, substantially the same components are denoted by the same reference numerals, and a description of the same components will be omitted. The following first to third embodiments are collectively referred to as a "present embodiment". The brake device for vehicle in the present embodiments is mounted on a vehicle in which multiple electric brakes are provided on each wheel, and converts the torque output by a motor into a linear force by a linear mechanism and generates the braking force pressed against the corresponding wheel. The brake device for the vehicle includes a braking force control unit that controls a braking force generated by each of the electric brakes.

(Vehicle Configuration)

The configurations of a vehicle 900 on which the brake device 30 for the vehicle of the present embodiment is mounted and electric brakes 81 to 84 will be described with reference to FIGS. 1 to 3B. As shown in FIG. 1, the vehicle 900 is a four-wheel vehicle having two rows of left and right pairs of wheels 91, 92, 93, 94 in a front-rear direction. The left and right wheels 91, 92 at the front row may also be noted as "FL" and "FR", respectively. The left and right wheels 93, 94 at the rear row may also be noted as "RL" and "RR", respectively. The electric brakes 81, 82, 83, 84 are provided for the respective wheels 91, 92, 93, 94. In other words, four electric brakes are provided in this example. Hereinafter, four consecutive reference numerals will be appropriately abbreviated to "wheels 91 to 94" and "electric brakes 81 to 84" in some occasions.

The vehicle brake device 30 includes a braking force control unit 400. The braking force control unit 400 controls the braking forces generated by the electric brakes 81 to 84 based on a required braking force commanded from an outside. The required braking force is commanded by the driver's brake operation, a braking signal from a driving support device, or the like. At least a part of the position sensor signals θ and X representing the operating positions of the motors or linear motion mechanisms that constitute each of the electric brakes 81 to 84, and the load sensor signal F representing the pressing load of the brake pads, is input to the braking force control unit 400. The sensor signals θ, X, and F will be described in detail later with reference to FIG. 2. Which sensor signal is input to the braking force control unit 400 varies depending on the embodiment.

Figure 2:
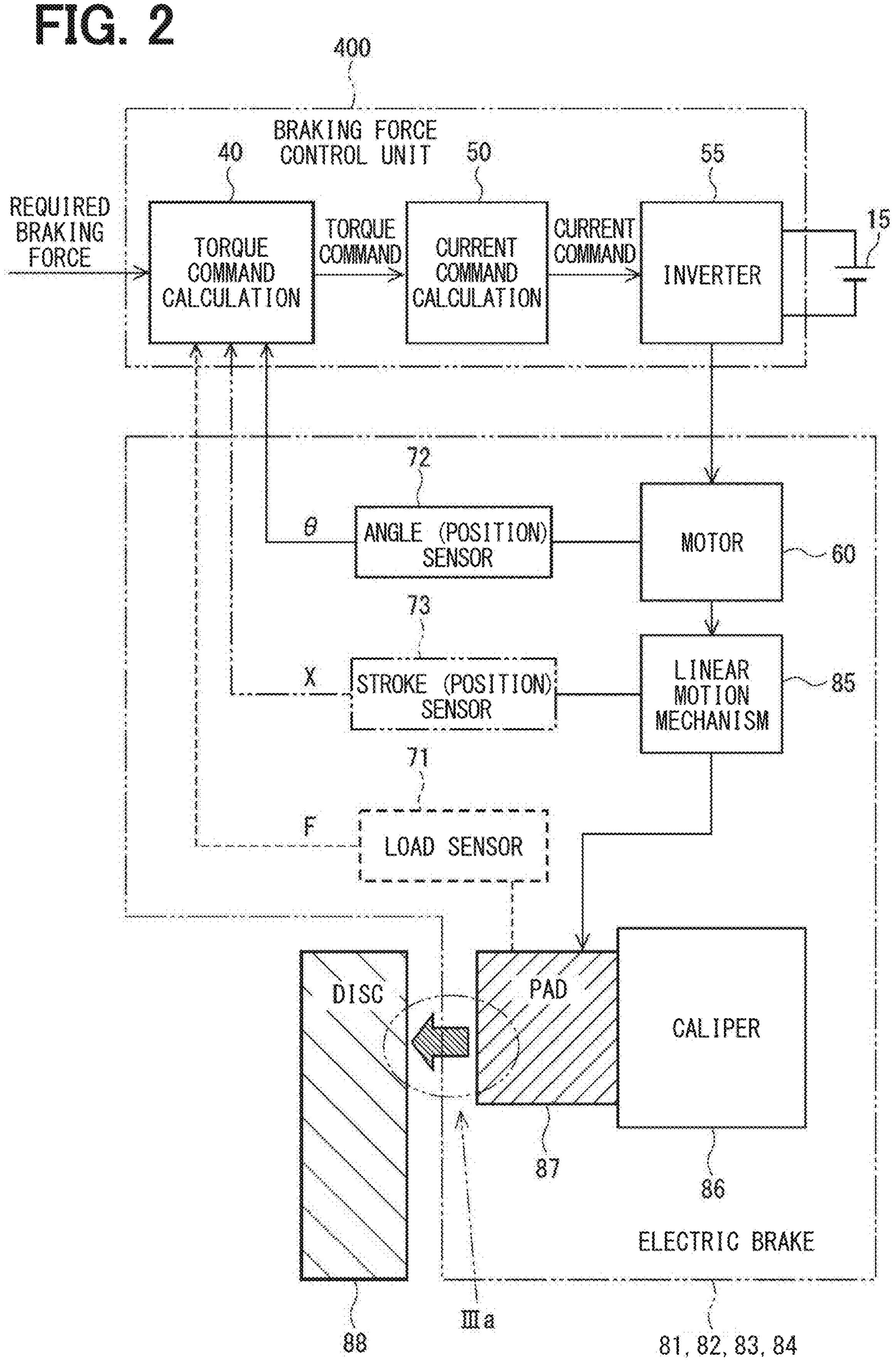
FIG. 2 is a block diagram of a braking force control of an electric brake corresponding to each wheel.

In the present embodiment, the control configurations of the electric brakes 81 to 84 are the same. FIG. 2 illustrates the control configuration of the electric brakes by the braking force control unit 400, taking any one of the electric brakes 81 to 84 as an example.

Each of the electric brakes 81 to 84 includes a motor 60, a linear motion mechanism 85, and a caliper 86. The motor 60 is, for example, a permanent magnet type three-phase brushless motor, and outputs torque in response to a driving current supplied from the braking force control unit 400. The linear motion mechanism 85 is an actuator that converts the output rotation of the motor 60 into linear motion while decelerating the output rotation. The rotation angle θ of the motor 60 and the stroke X of the linear motion mechanism 85 are proportional to each other. In this manner, each of the electric brakes 81 to 84 converts the torque output by the motor 60 into linear force by the linear motion mechanism 85 and generates a braking force to press against the corresponding wheel 91 to 94.

The output torque of the motor 60 operates a pad 87 of a caliper 86 via the linear motion mechanism 85. The pad 87 moves and presses against the disks 88 of each wheel 91 to 94 to generate a braking force through friction. Furthermore, the pad 87 separates from the disk 88, and the braking force is released.

Figure 3A:
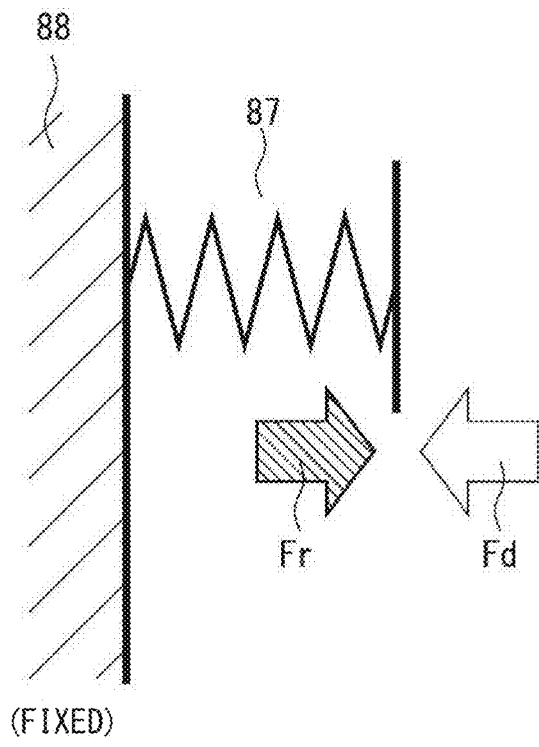
FIG. 3A is a schematic diagram of an electric brake pad.
Figure 3B:
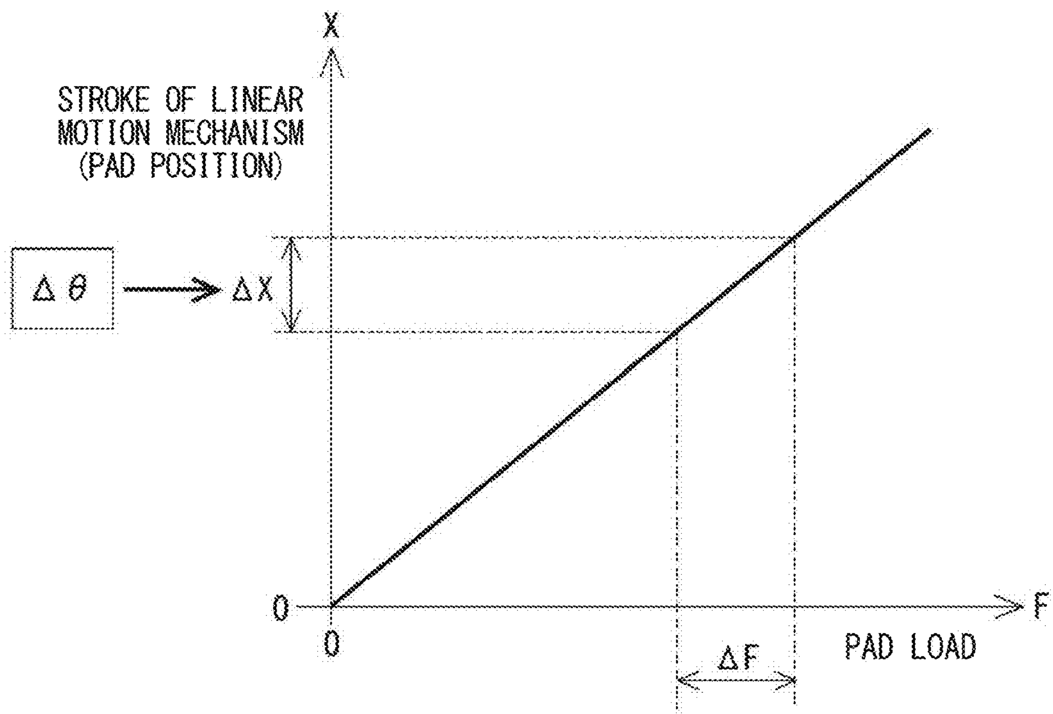
FIG. 3B is a characteristic diagram of a pad load and a pad position.

With reference to FIGS. 3A, 3B, the characteristics of the pad 87 of the electric brakes 81 to 81 shown in a portion IIIa of FIG. 2 will be supplemented. As shown in FIG. 3A, the pad 87 has spring-like characteristics, and a pressing force Fd by the linear motion mechanism 85 and a reaction force Fr according to the amount of deformation act in opposite directions. As shown in FIG. 3B, a pad position X based on the stroke of the linear motion mechanism 85 and a pad load F are approximately proportional. When the pad position changes by ΔX due to a change 40 in the rotation angle of the motor 60, the pad load changes by ΔF. A symbol "ΔF" indicates the change in load only in FIG. 3B. The symbol "ΔF" has a different meaning from "ΔF" used in FIG. 5 and subsequent figures, which indicates a load deviation between the load command value and the actual load.

Returning to FIG. 2, the braking force control unit 400 includes a torque command calculation unit 40, a current command calculation unit 50, and an inverter 55. The torque command calculation unit 40 calculates a torque command value for the motor 60 based on a required braking force commanded from an external source. The current command calculation unit 50 calculates a current command value for supplying current to the motor 60 based on the torque command value.

The inverter 55 converts the DC power of the battery 15 into AC power, and supplies the AC power according to the current command value to the motor 60. A detailed description of the configuration from the current command calculation unit 50 to the inverter 55 will be omitted. According to a general motor control technique, for example, the inverter 55 performs a switching operation in accordance with a switching signal by PWM control.

Further, the electric brakes 81 to 84 are equipped with at least one of angle sensors 72 indicated by a solid line and a stroke sensor 73 indicated by a two-dot chain line. The angle sensor 72 detects an actual angle θ, which is an actual rotation angle of the motor 60. The stroke sensor 73 detects an actual stroke X, which is the actual stroke of the linear motion mechanism 85. The stroke sensor 73 may detect a change in the position of a moving part of the linear motion mechanism 85, or may detect a change in the position of the pad 87.

The angle sensor 72 and the stroke sensor 73 are collectively referred to as a "position sensor." The position sensors 72, 73 are formed of, for example, a Hall element or a magnetic resistance element, and are capable of detecting the position with a relatively high degree of accuracy. Moreover, the actual angle θ and the actual stroke X are collectively referred to as an "actual position." The actual positions θ, X detected by the position sensors 72, 73 are input to the torque command calculation unit 40. In the present embodiment, a configuration mainly including an angle sensor 72 is assumed, and in the following description, only the symbols "position sensor 72" and "actual position θ" are used. The configuration including the stroke sensor 73 will be described in other embodiments.

In the first and second embodiments, the electric brakes 81 to 84 further include a load sensor 71 indicated by a dashed line. The load sensor 71 detects an actual load F which is the braking load actually applied to the wheels 91 to 94. The load sensor 71 is composed of, for example, a load cell, and has lower detection accuracy than the position sensor 72. The actual load F detected by the load sensor 71 is input to the torque command calculation unit 40. In the third embodiment, the electric brakes 81 to 84 do not include the load sensor 71 in the first place, or the actual load F detected by the load sensor 71 is not used for the calculation by the torque command calculation unit 40.

Figure 4:
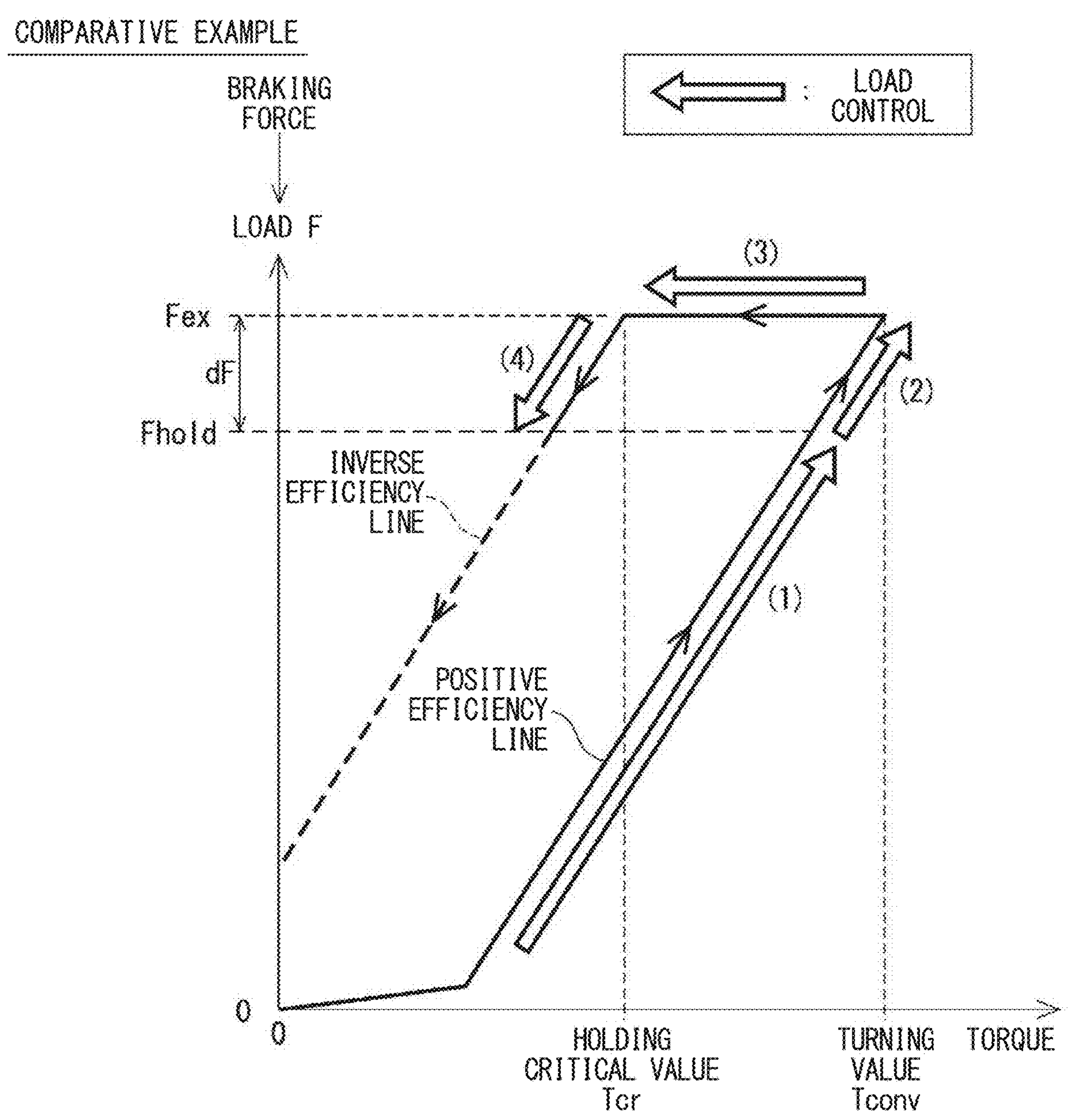
FIG. 4 is a diagram showing a braking force control in a load control according to a comparative example.

Next, the relationship between the motor torque and the braking force in the electric brake having this configuration will be described with reference to FIG. 4. The braking force is related to the brake pad load. Hereinafter, the term "torque" simply means the torque output by the motor 60, and the term "load" simply means the pressure load applied by the pad 87. FIG. 4 is treated as a comparative example in this specification for reasons that will be described later.

The relationship between the torque of the motor 60 and the braking forces generated in the electric brakes 81 to 84 has a hysteresis characteristic. When the torque increases, the braking force increases along the positive efficiency line. When the torque decreases from a turning value Tconv, where the torque changes from increasing to decreasing, to a holding critical value Tcr, the braking force is held constant. When the torque decreases from the holding critical value Tor, the braking force decreases along the inverse efficiency line.

On the vertical axis, "Fhold" is a target value of the load, and "dF" is an offset value. "Fex(=Fhold+dF)" is "a predetermined value greater than a target value" obtained by adding an offset value to the target value. In the conventional technology, the torque of the motor is increased until the magnitude of the load detected by the load sensor reaches a "predetermined value Fex that is greater than the target value". Thereafter, the motor drive current is controlled so as to reduce the motor torque until the magnitude of the load detected by the load sensor reaches the target value.

The braking force that is actually output by the electric brakes 61 to 64 is called the "actual braking force". When the actual braking force is increased to the required braking force and then maintained, the terms of the first to fourth processes which represent the hysteresis changes in the torque and braking force are defined. Numbers (1) to (4) in FIG. 4 correspond to the first to fourth processes.

In the first process, an "increasing operation" is performed to increase the torque of the motor 60 along the positive efficiency line until the actual braking force reaches the required braking force. In the second process, an "excess operation" is performed in which the torque of the motor 60 is increased along the positive efficiency line following the first process until the actual braking force reaches a target excess braking force that is a predetermined excess amount greater than the required braking force. In the third process, a "holding operation" is performed in which the torque of the motor 60 is reduced while the braking force at an end of the excess operation is maintained. In the fourth process, a "return operation" is performed to reduce the torque of the motor 60 along the inverse efficiency line until the actual braking force reaches the required braking force.

In FIG. 4, the white block arrows attached to the first to fourth processes indicate load control based on the actual load F detected by the load sensor 71. That is, in the comparative example corresponding to the conventional technology, the load control is performed in all of the first to fourth processes.

However, since the load sensor 71 generally has low accuracy, in the comparative example, it is necessary to change the braking force corresponding to the offset value dF that is equal to or greater than the resolution of the load sensor 71 during the excess operation. This may result in a large discrepancy between the required braking force and the maintained braking force, resulting in a deterioration in the braking feeling. Furthermore, when the pad 87 or disc 88 are deformed due to temperature changes or the like, a phenomenon may occur in which the operating point does not change even though the load is changing. In this case, the effect of reducing the drive current of the motor 60 may not be sufficient.

Therefore, the brake device 30 for the vehicle of the present embodiment aims to reduce the deviation from the required braking force when the braking force is increased and maintained, and to ensure the effect of reducing the motor drive current. The torque command calculation unit 40 in each embodiment changes the torque command value in the order of the first process, the second process, the third process, and the fourth process when increasing and maintaining the actual braking force up to the required braking force. The torque command calculation unit 40 calculates a torque command value by position control based on the actual position θ detected by the position sensor 72 at least in the second process.

Next, a detailed configuration of each embodiment will be described. The torque command calculation units in the first and second embodiments are labeled with the reference numeral "401," while the torque command calculation unit in the third embodiment is labeled with the reference numeral "403" for distinction.

First and Second Embodiments

A first embodiment and a second embodiment will be described with reference to FIGS. 5 to 8. In the first and second embodiments, as the process progresses from the first to fourth processes, a switch is made between a load control based on the actual load F detected by the load sensor 71 and a position control based on the actual position θ detected by the position sensor 72.

Figure 5:
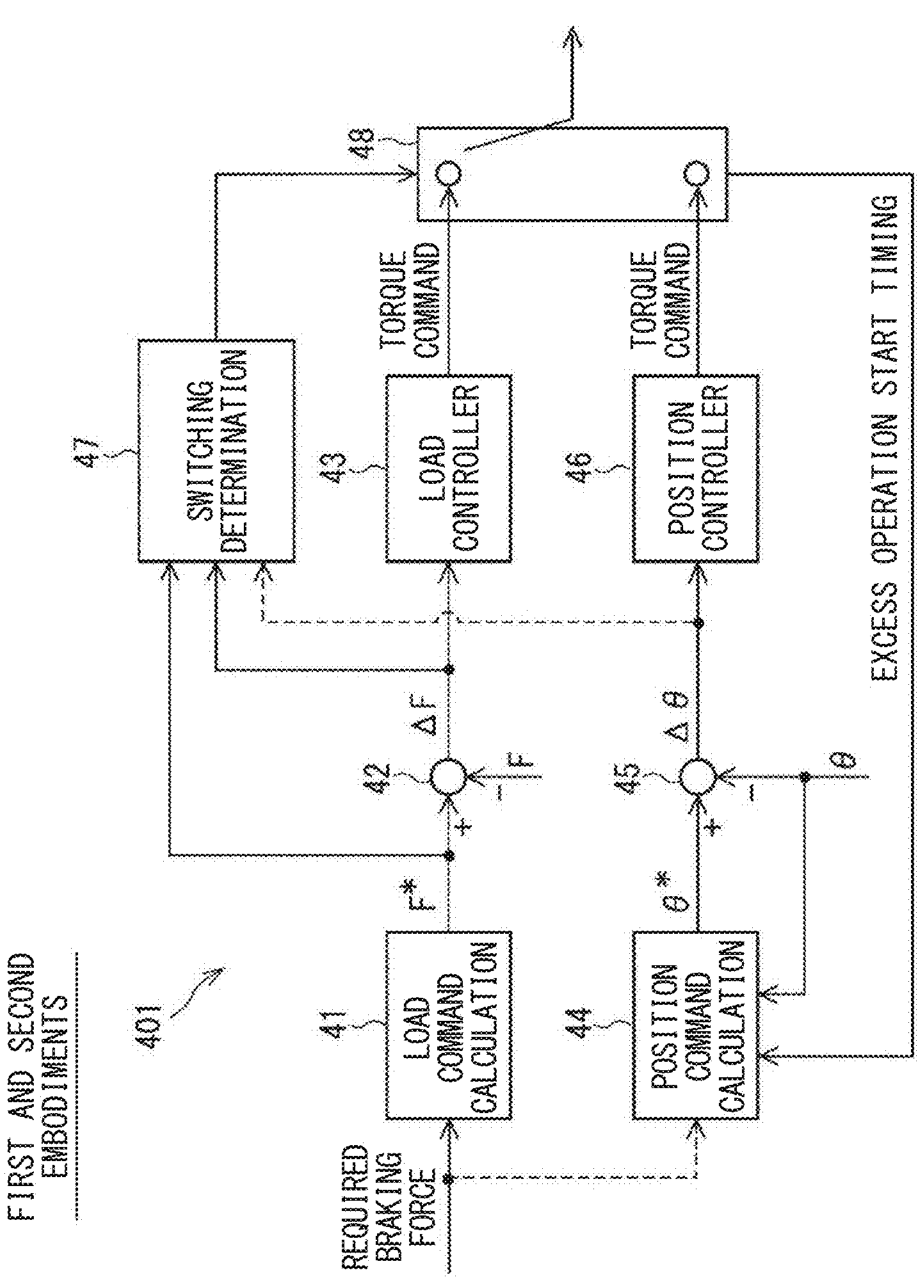
FIG. 5 is a block diagram of a torque command calculation unit according to the first and second embodiments.

FIG. 5 shows a block diagram of the torque command calculation unit 401 in the first and second embodiments. The torque command calculation unit 401 has a load command calculation unit 41, a load deviation calculator 42, a load controller 43, a position command calculation unit 44, a position deviation calculator 45, a position controller 46, a switching determination unit 47, and a switch 48.

The load command calculation unit 41 calculates a load command value F* based on the required braking force. The load deviation calculator 42 calculates a load deviation ΔF ($=|F^*-F|$) between the actual load F detected by the load sensor 71 and the load command value F*. The load controller 43 calculates a torque command value so as to bring the load deviation ΔF closer to zero, that is, so as to bring the actual load F closer to the load command value F*.

The position command calculation unit 44 calculates a position command value θ* by a method to be described later or based on the required braking force as indicated by the dashed line. The position deviation calculator 45 calculates a position deviation Δθ($=|\theta^*-\theta|$) between an actual position θ detected by the position sensor 72 and a position command value θ*. The position controller 46 calculates a torque command value so as to bring the position deviation 40 closer to zero, that is, so as to bring the actual position θ closer to the position command value θ*.

The switching determination unit 47 is configured to calculate a torque command value for the motor 60 in accordance with each of the first to fourth processes and determines the switching between the load control by the load controller 43 and the position control by the position controller 46.

The load command value F*, the load deviation ΔF, and, in some embodiments, the position deviation Δθ are input to the switching determination unit 47. The load command value F* is used to obtain the fluctuation of the required braking force. When the amount of fluctuation in the load command value F* is within a predetermined range and the load deviation ΔF falls below the load deviation threshold, it is determined that the actual load F in the load control has reached the load command value F*. Furthermore, when the position deviation Δθ falls below the position deviation threshold value, it is determined that the actual position θ in the position control has reached the position command value θ*.

The switch 48 switches the torque command value output by the torque command calculation unit 401 in response to a command from the switching determination unit 47. In the configuration example shown in FIG. 5, the switch 48 is provided on the output side of each controller 43, 46, but this switching function is not limited to this configuration, and a switching function may be realized, for example, to mask the operation of one of the load controller 43 and the position controller 46.

The timing at which the first process transitions to the second process is referred to as a "excess operation start timing." The load command calculation unit 41 may perform calculation so that the actual position θ acquired at the excess operation start timing notified by the switch 48 becomes the position command value θ*. This position command value θ* becomes the initial position command value in the position control of the second process. This will be described in detail later with reference to the flow chart of FIG. 12.

Figure 6:
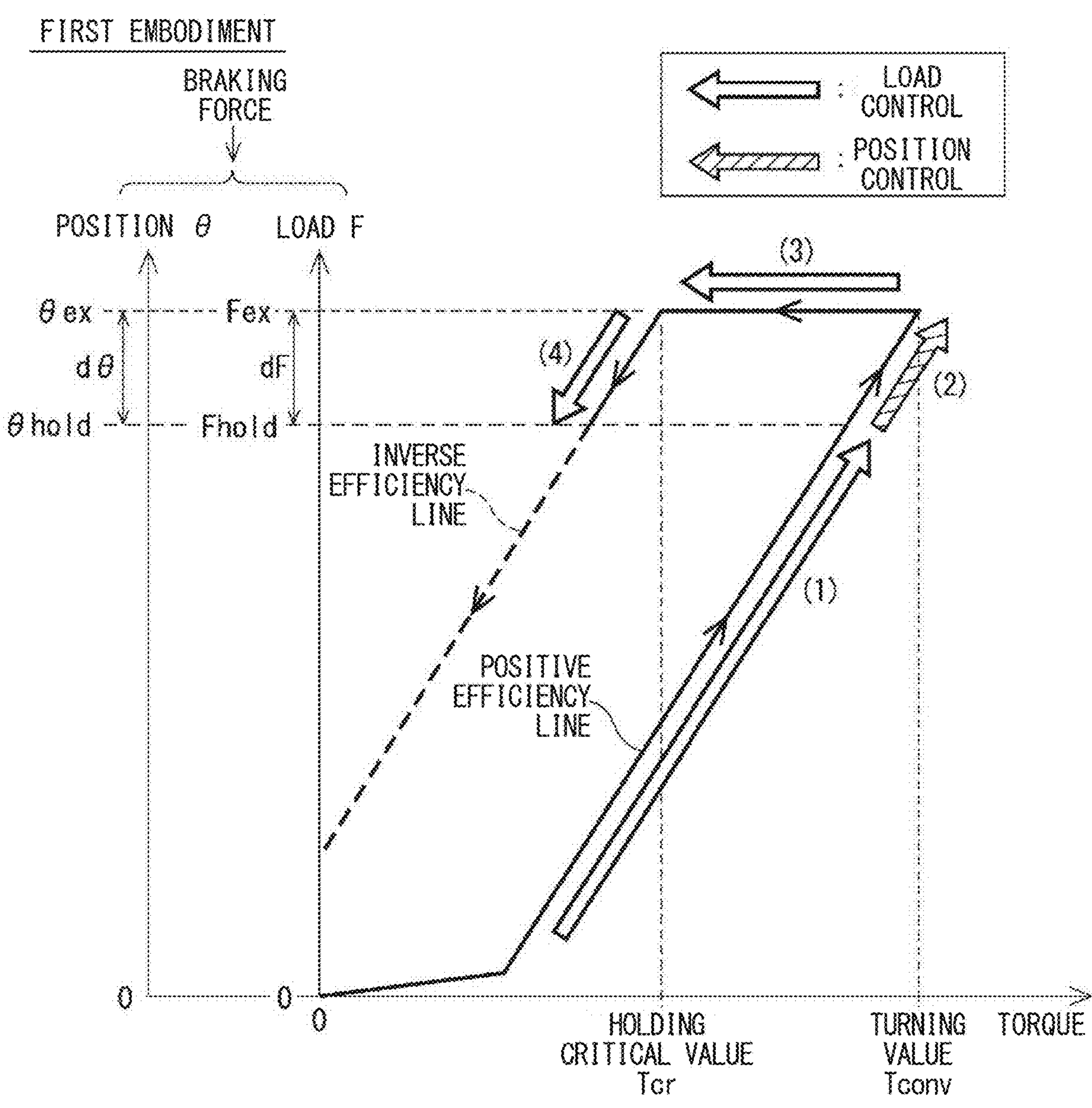
FIG. 6 is a diagram illustrating a switching between a load control and a position control according to the first embodiment.

FIG. 6 shows switching between the load control and the position control according to the first embodiment. The hysteresis characteristic of the torque and braking force is the same as that of the comparative example shown in FIG. 4. As indicated by the double vertical axis, in the first and second embodiments, the braking force correlates with the load F and the position θ. In other words, the load F and the position θ are used doubly as parameters correlated with the braking force.

The load F corresponding to the required braking force becomes a target holding load Fhold, and the position θ corresponding to the required braking force becomes a target holding position θhold. Further, the load F corresponding to the target excessive braking force becomes a target excessive load Fex (=Fhold+dF) which is larger than the target holding load Fhold by the load excess amount dF. The position θ corresponding to the target excessive braking force becomes a target excessive position θex(=θhold+dθ) which is larger than the target holding position θhold by a position excess amount de. Here, the magnitude of the position θ is defined according to the magnitude of the corresponding braking force. In other words, the greater the corresponding braking force, the greater the position θ.

Figure 7:
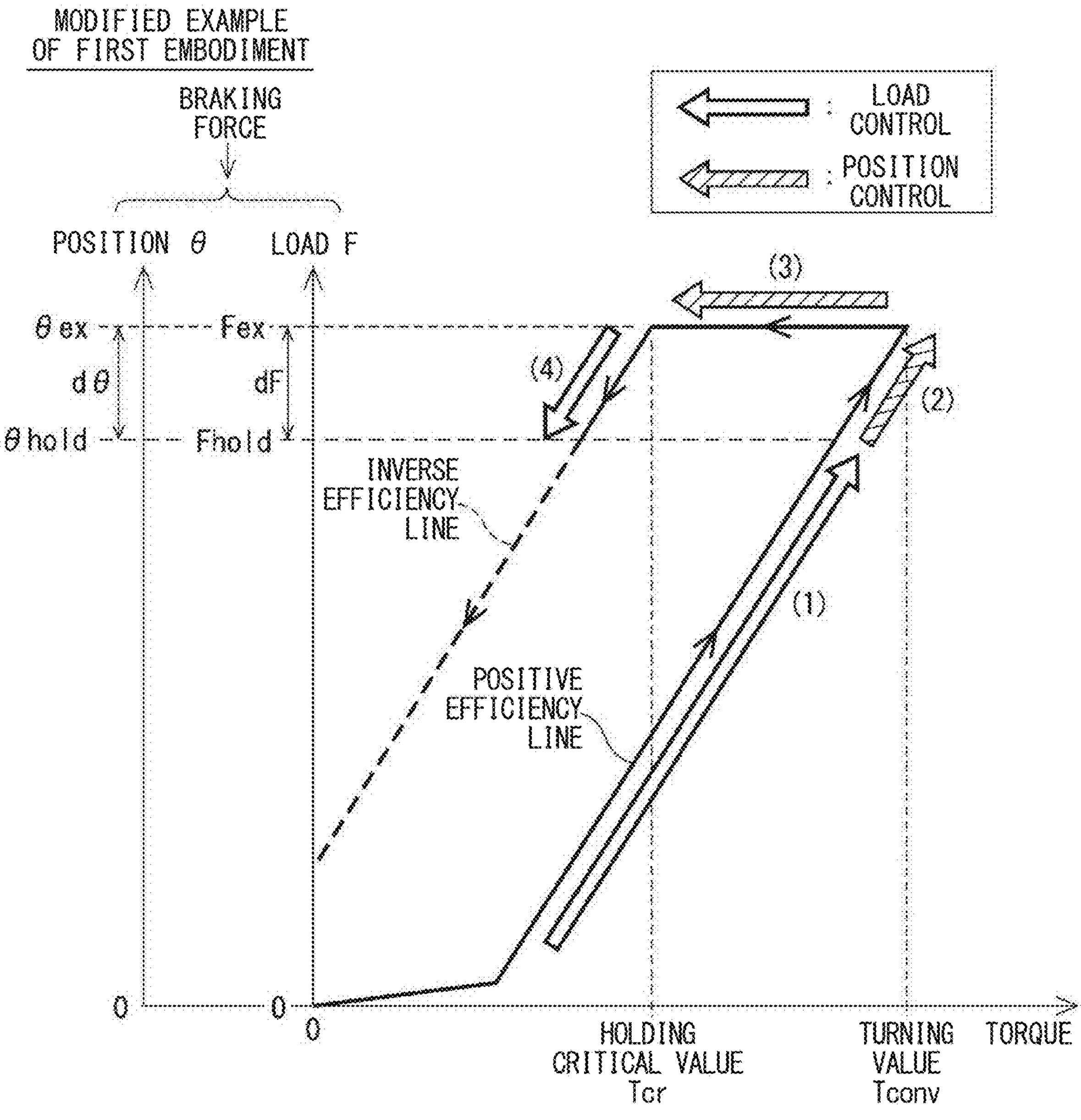
FIG. 7 is a diagram illustrating a switching between a load control and a position control according to a modified example of the first embodiment.
Figure 8:
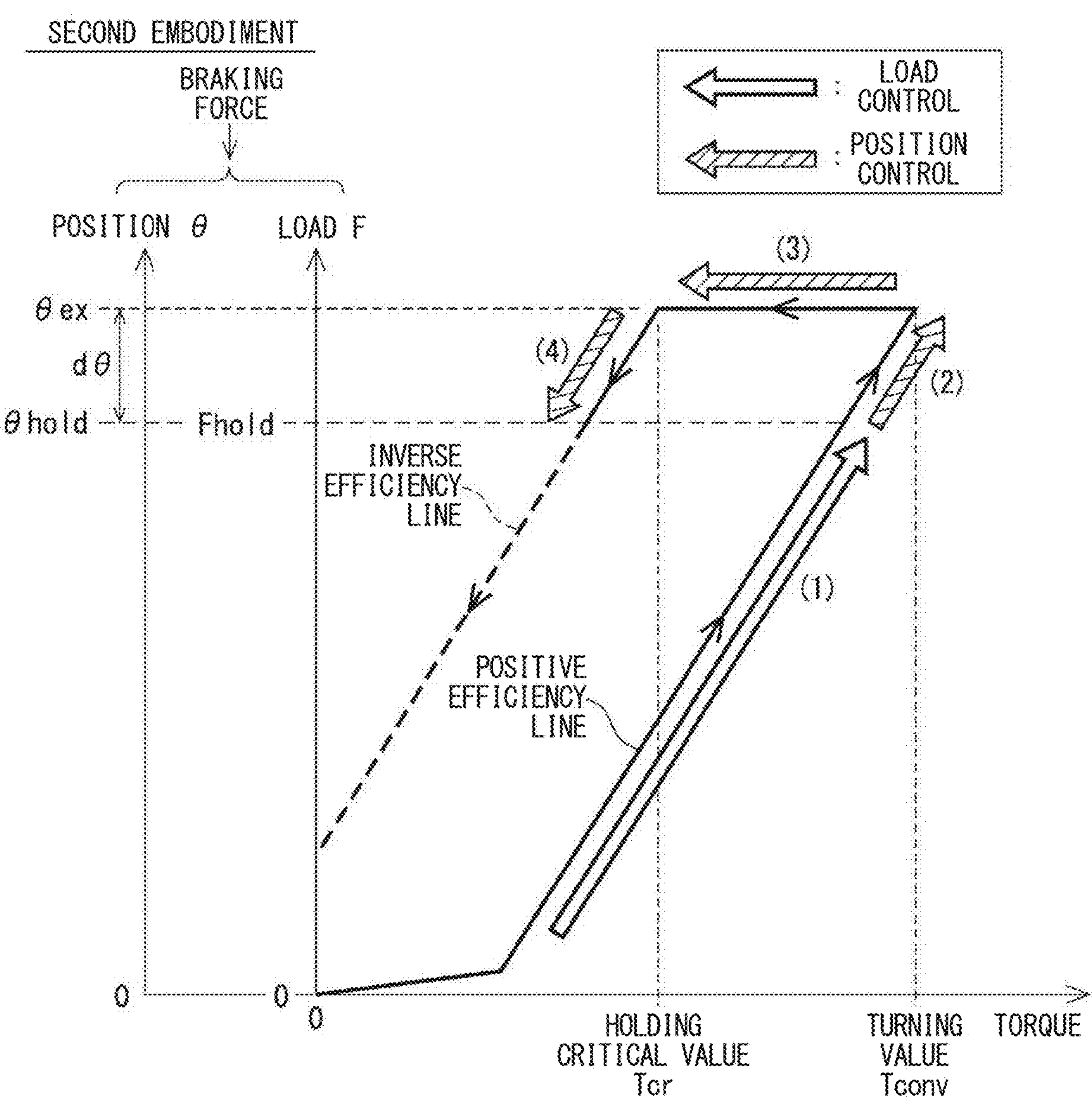
FIG. 8 is a diagram showing a switching between the load control and the position control according to a second embodiment.

In FIGS. 6 to 8, the outlined block arrows represent the load control, and the hatched block arrow represents the position control. In both the first and second embodiments, the torque command calculation unit 401 executes the load control in the first process. In the first embodiment, the torque command calculation unit 401 executes the position control in the second process and executes the load control in the third and fourth processes. When transitioning from the first process to the second process, the torque command calculation unit 401 switches from the load control to the position control by the switching determination unit 47.

More specifically, when transitioning from the first process to the second process, when the load deviation ΔF falls below the load deviation threshold value, the switching determination unit 47 commands the switch 48 to switch to the position control. The torque command calculation unit 401 stores the actual load F detected by the load sensor 71 at the excess operation start timing when the first process is changed to the second process as the target holding load Fhold. In the second process, a torque command value calculated by the position controller 46 is used so as to bring the actual position θ closer to the position command value θ*.

Furthermore, when transitioning from the second process to the third process, when the position deviation Δθ falls below the position deviation threshold value, the switching determination unit 47 commands the switch 48 to switch to the load control. In the third process, no active control is performed, and the torque decreases naturally from the positive efficiency line to the inverse efficiency line. When the torque command value decreases to the inverse efficiency line, the load control is maintained, and the process moves to the fourth process. In the fourth process, the torque command calculation unit 401 continues the return operation until the actual load F reaches the target held load Fhold.

In the first embodiment, the highly accurate position sensor 72 is used in the excess operation of the second process, and the position excess amount de can be set as small as possible according to the resolution of the position sensor 72 to perform the position control. Therefore, compared to the comparative example in which the load control is performed in the second process, the deviation between the actual braking force and the required braking force during the holding operation can be reduced, and the deterioration of the feeling can be prevented. Furthermore, even if a load change occurs due to a temperature change or the like, the position of the motor 60 and the linear motion mechanism 85 can be directly detected by the position sensor 72, so that the motor drive current can be reduced until an operating point changes reliably.

In addition, since the existing electric brakes 81 to 84 are equipped with the load sensor 71, the torque command calculation unit 401 can switch control so that the position control is performed only in the second process and the load control is performed in the first, third, and fourth processes, thereby minimizing changes to the existing design. Furthermore, by controlling the third and fourth steps in the same way, it becomes possible to transition from the holding operation to the return operation naturally without having to determine the end of the holding operation.

FIG. 7 shows the switching between the load control and the position control according to a modified example of the first embodiment. In this modified example, the torque command calculation unit 401 executes the position control in the third process following the second process and executes the load control in the fourth process. In other words, the position control is switched to the load control not at the timing when the excess operation moves to the holding operation but at the timing when the holding operation moves to the return operation. In this modified example, it is necessary to add a logic for the switching determination unit 47 to determine the end of the holding operation, but by performing the position control in the second process, the same effects as in the first embodiment can be obtained.

FIG. 8 shows switching between the load control and the position control according to the second embodiment. In the second embodiment, the torque command calculation unit 401 executes the position control in the third process and the fourth process following the second process. As in the first embodiment, when transitioning from the first process to the second process, the torque command calculation unit 401 switches from the load control to the position control by the switching determination unit 47.

The torque command calculation unit 401 stores the actual position θ detected by the position sensor 72 at the excess operation start timing when the first process is changed to the second process as a target holding position θhold. In the second process, a torque command value calculated by the position controller 46 is used so as to bring the actual position θ closer to the position command value θ*.

When the actual position θ reaches the target excess position θex, the process moves from the second process to the third process, and the torque decreases naturally from the positive efficiency line to the inverse efficiency line while maintaining the braking force at the end of the excess operation. When the torque command value decreases to the inverse efficiency line, the process proceeds to the fourth process while maintaining the position control. In the fourth process, the torque command calculation unit 401 continues the return operation until the actual position θ reaches the target holding position θhold.

In the second embodiment, by performing the position control in the second process, the same effects as those of the first embodiment can be obtained. Furthermore, for a minute position excess amount de, the position control can be performed with the same accuracy in the excess operation and the return operation.

Third Embodiment

Figure 9:
FIG. 9 is a block diagram of a torque command calculation unit according to a third embodiment.
Figure 9:
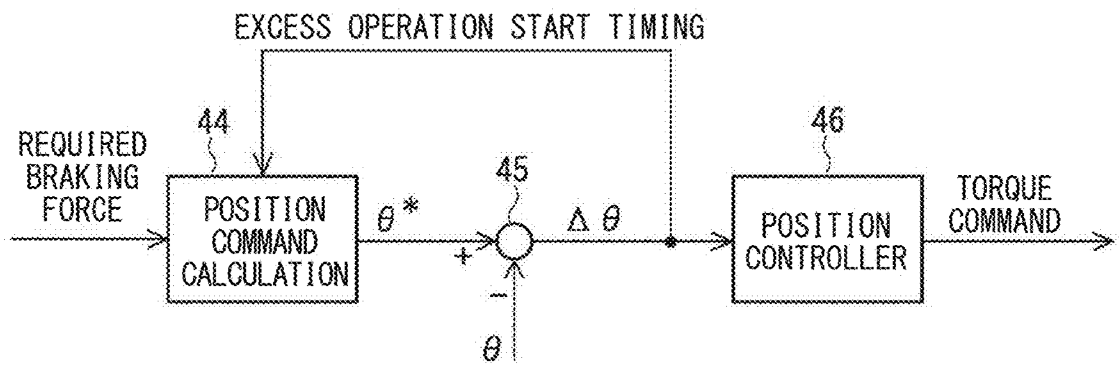

A third embodiment will be described with reference to FIGS. 9 and 10. In the third embodiment, the torque command calculation unit 403 executes the position control based on the actual position θ detected by the position sensor 72 in all of the first to fourth processes. FIG. 9 shows a block diagram of the torque command calculation unit 403 according to the third embodiment. The torque command calculation unit 403 includes the position command calculation unit 44, the position deviation calculator 45, and the position controller 46.

The position command calculation unit 44 calculates a position command value θ* based on the required braking force. In the configuration of FIG. 5, the required braking force is basically input to the load command calculation unit 41, and may also be input to the position command calculation unit 44. In contrast, in the configuration of FIG. 9, since the load command calculation unit 41 is not provided, the required braking force is always input to the position command calculation unit 44. The position deviation calculator 45 and the position controller 46 have the same configuration as those shown in FIG. 5.

The position deviation Δθ (=|θ*−θ|) calculated by the position deviation calculator 45 is fed back to the position command calculation unit 44. When the position deviation Δθ falls below the position deviation threshold value, the position command calculation unit 44 determines that the actual position θ in the position control has reached the position command value θ*.

Figure 10:
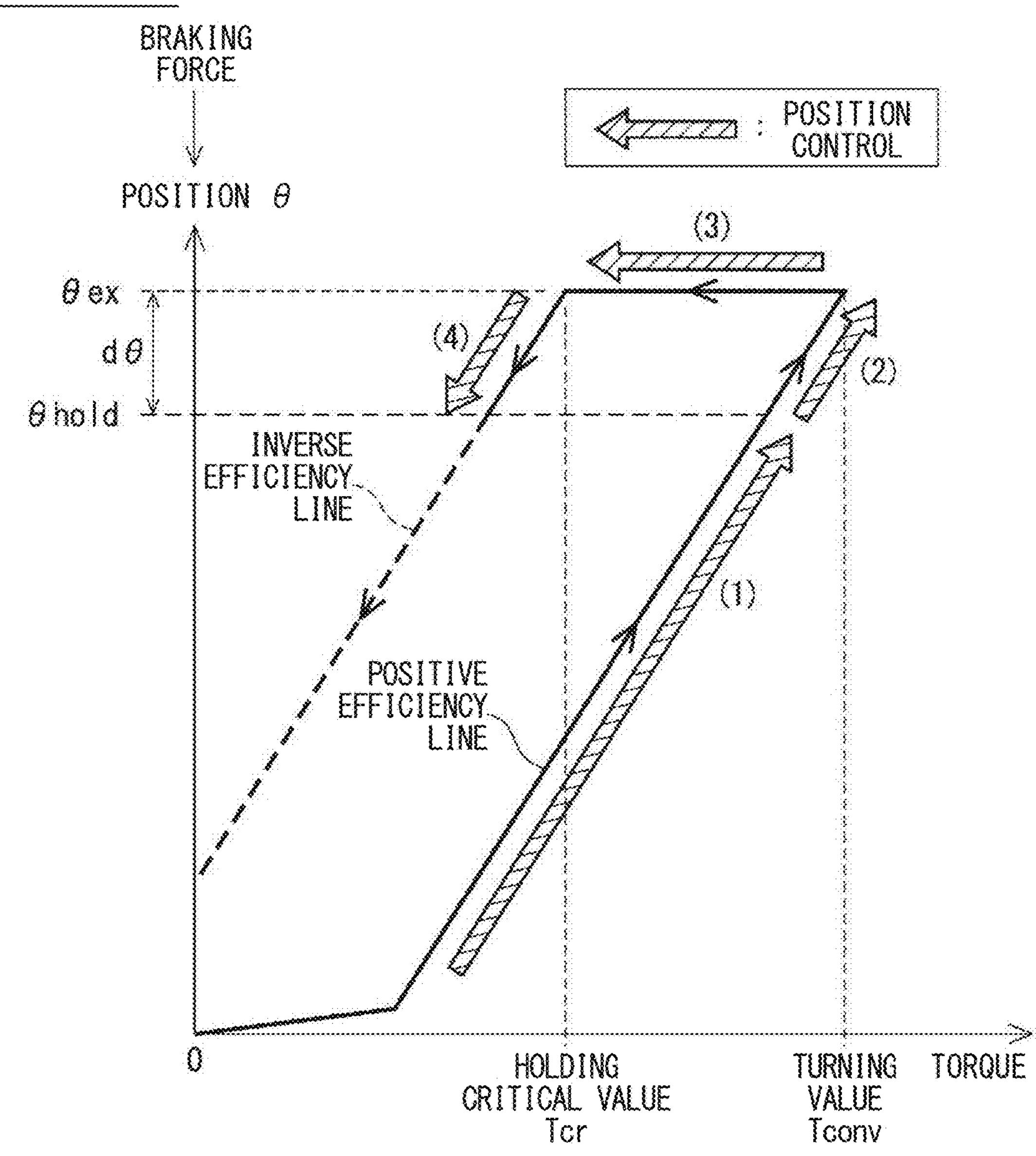
FIG. 10 is a diagram showing braking force control in position control according to the third embodiment.

FIG. 10 shows the braking force control by the position control according to the third embodiment. The hysteresis characteristics of the torque and the braking force are the same as those in the comparative example and the first and second embodiments. In the third embodiment, the braking force is correlated only to the position θ. In FIG. 10, the block arrows with hatching represent the position control. The torque command calculation unit 403 executes the position control in the first process.

The torque command calculation unit 403 stores the actual position θ detected by the position sensor 72 at the timing when the actual position θ reaches the position command value θ* corresponding to the required braking force and the excess operation starts to transition from the first process to the second process as the target holding position θhold. Thereafter, the position control continues up to the fourth process in the same manner as in the second embodiment.

In the third embodiment, by performing the position control in the second process, the same effects as those of the first and second embodiments can be obtained. Furthermore, since logic for switching between the load control and the position control is not required, the configuration of the torque command calculation unit 403 is simplified.

[Flowchart of Braking Force Control According to the Present Embodiment]

Next, the braking force control will be described comprehensively in the first to third embodiments with reference to the flowcharts of FIG. 11 and FIG. 12. In the following flowchart, a symbol S indicates a step.

Figure 11:
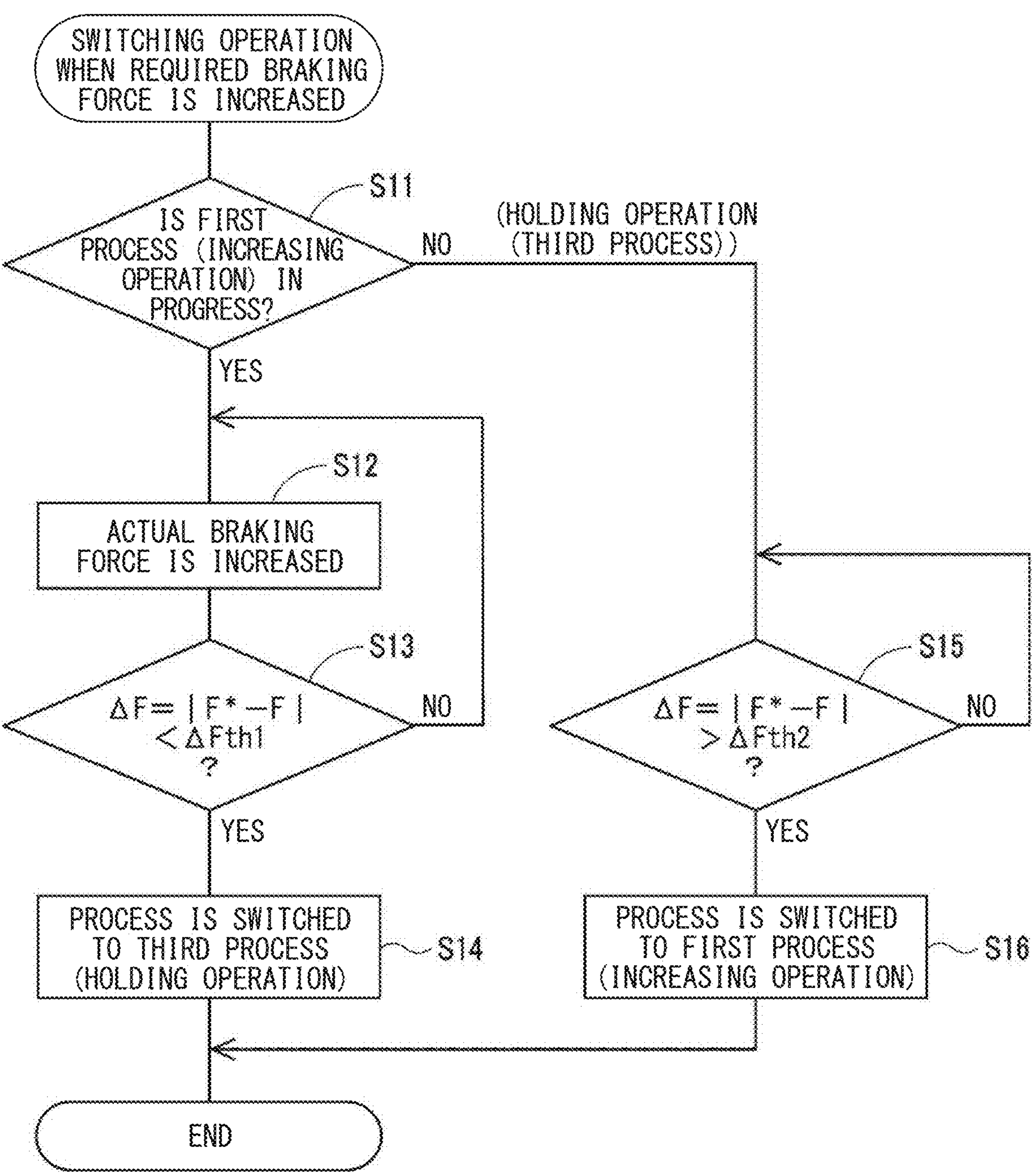
FIG. 11 is a flowchart of an operation switching when a required braking force is increased.

FIG. 11 shows a flow of operation switching when the required braking force is increased. This flow is applicable to the first and second embodiments in which the load control is performed in the first process. Considering the situations in which the first and second embodiments are effectively used, the time when the required braking force is decreasing is omitted from the assumptions. Therefore, the logic for determining whether the required braking force is increasing or decreasing is also omitted. However, in a practical system design, it is necessary to design the flow including the case where the required braking force decreases.

In S11, it is determined whether the first process (increasing operation) is in progress. When the answer is YES in S11, the actual braking force is increased in S12. In S13, it is determined whether the load deviation ΔF is smaller than the load deviation threshold value ΔFth1. When the answer is YES in S13, in S14, the process is switched to the third process (holding operation) via the second process (excess operation).

When the answer is NO in S11, it is assumed that the third process (holding operation) is in progress. In the above embodiment, it is not assumed that the required braking force will suddenly change during the third process. However, in reality, there may be cases where the required braking force will suddenly change during the third process, and the load command value F* will suddenly change accordingly. When the case of a sudden decrease in the required braking force is excluded from the assumption that the required braking force increases, it is possible to assume a case in which the load command value F* increases suddenly, and the load deviation ΔF between the actual load F and the load command value F* increases suddenly. In S15, it is determined whether the load deviation ΔF is greater than the load deviation threshold value ΔFth2. When the answer is YES in S15, the third process (holding operation) is stopped in S16, and the process is switched to the first process (increasing operation).

Figure 12:
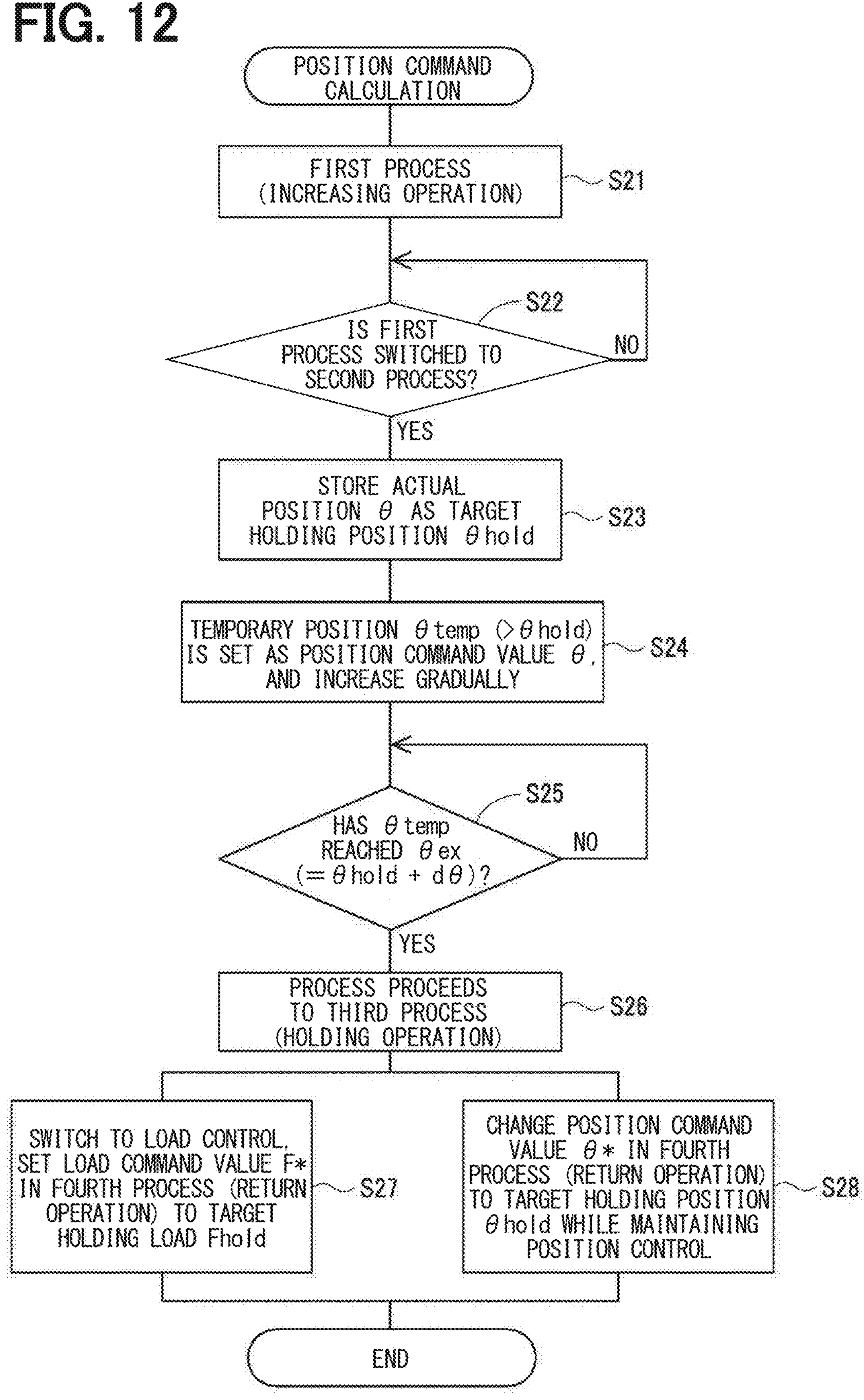
FIG. 12 is a flowchart of a position command calculation.

FIG. 12 shows a flow of the position command calculation by the position command calculation unit 44. In S21, the first process (increasing operation) is performed. In S22, it is determined whether the actual braking force has reached the required braking force and the first process has been switched to the second process. When the answer is YES in S22, the actual position θ at the excess operation start timing is stored as a target holding position θhold in S23.

In S24, in the second process (excess operation), the position control is performed while gradually increasing the position command value θ*. Specifically, a temporary position θtemp larger than the target holding position θhold is set as the position command value θ*, and the temporary position θtemp is increased prior to an increase in the actual position θ. As a result, the actual position θ increases in accordance with the increase in the temporary position θtemp (i.e., the position command value θ*).

In S25, it is determined whether the temporary position θtemp has reached the target excess position θex. When the answer is YES in S25, the process proceeds to the third process (holding operation) in S26. After S26, two steps, S27 or S28, can be selected.

In S27 corresponding to the first embodiment, the control is switched to the load control, and the load command value F* for the fourth process (return operation) is set to the target holding load Fhold. In S28 corresponding to the second and third embodiments, the position command value θ* for the fourth process (return operation) is changed to the target holding position θhold while maintaining the position control.

Other Embodiments

The vehicle on which the vehicle braking device of the present disclosure is mounted is not limited to a four-wheel vehicle having two rows of left and right wheels in the vehicle front-rear direction, and may be a vehicle having six or more wheels having three or more rows of wheels in the vehicle front-rear direction.

In the above embodiment, it is assumed that the angle sensor 72 of the motor 60 is mainly used as the position sensor. However, the stroke sensor 73 of the linear motion mechanism 85 may be used as the position sensor. In this case, the position controller 46 calculates the torque command value so as to bring the position deviation ΔX closer to zero, that is, so as to bring the actual position X closer to the position command value X*.

The present disclosure should not be limited to the embodiment described above. Various other embodiments may be implemented without departing from the scope of the present disclosure.

The braking force controller and method described in the present disclosure may be implemented by a special purpose computer which is configured with a memory and a processor programmed to execute one or more particular functions embodied in computer programs of the memory. Alternatively, the braking force controller described in the present disclosure and the method thereof may be realized by a dedicated computer configured as a processor with one or more dedicated hardware logic circuits. Alternatively, the braking force controller and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modified examples and variations within the scope of equivalents. Furthermore, various combination and formation, and other combination and formation including one, more than one or less than one element may be made in the present disclosure.

What is claimed is:

1. A brake device for a vehicle mounted on a vehicle having a plurality of electric brakes, each of which is provided on each wheel, converts torque output by a motor into linear force by a linear motion mechanism and presses the corresponding wheel to generate braking force, the brake device for the vehicle, comprising:

a braking force control unit including a torque command calculation unit configured to calculate a torque command value for the motor based on a required braking force commanded from an external source, and a current command calculation unit configured to calculate a current command value for energizing the motor based on the torque command value, and that controls the braking force generated by each of the electric brakes; wherein the electric brake includes a position sensor for detecting an actual position which is an actual rotation angle of the motor or an actual stroke of the linear motion mechanism, a relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a holding critical value, the braking force is maintained constant, and as the torque decreases from the holding critical value, the braking force decreases along an inverse efficiency line, the torque command calculation unit includes a position controller that calculates the torque command value so that the actual position detected by the position sensor approaches a position command value, when an actual braking force, which is the braking force actually output by the electric brake, is increased and maintained at the required braking force, a process of increasing the torque of the motor along the positive efficiency line until the actual braking force reaches the required braking force is defined as a first process, a process of performing an excess operation of increasing the torque of the motor along the positive efficiency line following the first process until the actual braking force reaches a target excess braking force that is a predetermined excess amount greater than the required braking force is defined as a second process, a process of performing a holding operation in which the torque of the motor is reduced while the braking force at an end of the excess operation is held is defined as a third process, and a process of performing a return operation to reduce the torque of the motor along the inverse efficiency line until the actual braking force reaches the required braking force is defined as a fourth process, and the torque command calculation unit changes the torque command value in an order of the first process to the fourth process and performs a position control by the position controller at least in the second process.

2. The brake device for the vehicle according to claim 1, wherein, the electric brake has a load sensor for detecting an actual load which is a braking load actually applied to the wheel, the torque command calculation unit includes a load controller configured to calculate the torque command value so that the actual load detected by the load sensor approaches a load command value calculated based on the required braking force, and a switching determination unit configured to determine a switching between a load control by the load controller and a position control by the position controller as a configuration that calculates a torque command value for the motor in accordance with each of the first to fourth processes, the torque command calculation unit executes the load control during the first process, and when the first process transitions to the second process, the switching determination unit switches from the load control to the position control.

3. The brake device for the vehicle according to claim 2, wherein the torque command calculation unit executes the load control in the fourth process.

4. The brake device for the vehicle according to claim 2, wherein the torque command calculation unit executes the position control in the fourth process.

5. The brake device for the vehicle according to claim 3, wherein the torque command calculation unit stores the actual load detected by the load sensor at an excess operation start timing when the first process is changed to the second process as a target holding load, and in the fourth process, continues the return operation until the actual load reaches the target holding load.

6. The brake device for the vehicle according to claim 1, wherein the torque command calculation unit stores the actual position detected by the position sensor at an excess operation start timing when the first process is changed to the second process as a target holding position, and in the fourth process, continues the return operation until the actual position reaches the target holding position.

7. A brake device for a vehicle mounted on a vehicle having a plurality of electric brakes, each of which is provided on each wheel, converts torque output by a motor into linear force by a linear motion mechanism and presses the corresponding wheel to generate braking force, wherein the electric brake includes a position sensor for detecting an actual position which is an actual rotation angle of the motor or an actual stroke of the linear motion mechanism, and a relationship between the torque of the motor and the braking force generated by the electric brake has a hysteresis characteristics in which, as the torque increases, the braking force increases along a positive efficiency line, as the torque decreases from a turning value where the torque changes from increasing to decreasing to a holding critical value, the braking force is maintained constant, and as the torque decreases from the holding critical value, the braking force decreases along an inverse efficiency line, the brake device for the vehicle, comprising:

a computer including a processor and a memory that stores instructions configured to, when executed by the processor, cause the processor to calculate a torque command value for the motor based on a required braking force commanded from an external source, calculate a current command value for energizing the motor based on the torque command value, and control the braking force generated by each of the electric brakes, wherein when an actual braking force, which is the braking force actually output by the electric brake, is increased and maintained at the required braking force, a process of increasing the torque of the motor along the positive efficiency line until the actual braking force reaches the required braking force is defined as a first process, a process of performing an excess operation of increasing the torque of the motor along the positive efficiency line following the first process until the actual braking force reaches a target excess braking force that is a predetermined excess amount greater than the required braking force is defined as a second process, a process of performing a holding operation in which the torque of the motor is reduced while the braking force at an end of the excess operation is held is defined as a third process, and a process of performing a return operation to reduce the torque of the motor along the inverse efficiency line until the actual braking force reaches the required braking force is defined as a fourth process, and the computer causes the processor to calculate the torque command value so that the actual position detected by the position sensor approaches a position command value and perform a position control, and change the torque command value in an order of the first process to the fourth process, and perform the position control at least in the second process.

8. The brake device for the vehicle according to claim 7, wherein the electric brake has a load sensor for detecting an actual load which is a braking load actually applied to the wheel, the computer causes the processor to calculate the torque command value so that the actual load detected by the load sensor approaches a load command value calculated based on the required braking force and perform a load control, determine a switching between the load control and the position control as a configuration that calculates a torque command value for the motor in accordance with each of the first to fourth processes, execute the load control during the first process, and when the first process transitions to the second process, switch from the load control to the position control.

9. The brake device for the vehicle according to claim 8, wherein the computer causes the processor to execute the load control in the fourth process.

10. The brake device for the vehicle according to claim 8, wherein the computer causes the processor to execute the position control in the fourth process.

11. The brake device for the vehicle according to claim 9, wherein the computer causes the processor to store the actual load detected by the load sensor at an excess operation start timing when the first process is changed to the second process as a target holding load, and in the fourth process, continue the return operation until the actual load reaches the target holding load.

12. The brake device for the vehicle according to claim 7, wherein the computer causes the processor to store the actual position detected by the position sensor at an excess operation start timing when the first process is changed to the second process as a target holding position, and in the fourth process, continue the return operation until the actual position reaches the target holding position.

* * * * *